(12) United States Patent
Kosiankowski et al.

(10) Patent No.: US 8,075,235 B2
(45) Date of Patent: Dec. 13, 2011

(54) CLAMPING PART AND RETENTION DEVICE HAVING A CLAMPING PART OF THIS TYPE

(75) Inventors: Lueder Kosiankowski, Jork (DE); Lutz Zeuner, Hardebek (DE); Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 480 days.

(21) Appl. No.: 11/992,361

(22) PCT Filed: Sep. 27, 2006

(86) PCT No.: PCT/EP2006/009401
§ 371 (c)(1),
(2), (4) Date: Apr. 15, 2009

(87) PCT Pub. No.: WO2007/039213
PCT Pub. Date: Apr. 12, 2007

(65) Prior Publication Data
US 2009/0218452 A1 Sep. 3, 2009

Related U.S. Application Data

(60) Provisional application No. 60/721,397, filed on Sep. 28, 2005.

(30) Foreign Application Priority Data

Sep. 28, 2005 (DE) .......................... 10 2005 046 362

(51) Int. Cl.
*F16B 39/16* (2006.01)
(52) U.S. Cl. ........................................ 411/267; 411/433

(58) Field of Classification Search .................. 411/267, 411/433, 903, 970, 432, 434; 248/56; 285/195; 439/461
See application file for complete search history.

(56) References Cited

U.S. PATENT DOCUMENTS

| | | | | |
|---|---|---|---|---|
| 2,904,820 A * | 9/1959 | Flora | ............................ | 16/86 A |
| 3,352,341 A | 11/1967 | Schertz | | |
| 3,361,460 A | 1/1968 | Jansen | | |
| 4,358,079 A * | 11/1982 | Navarro | ......................... | 248/56 |
| 4,780,036 A * | 10/1988 | Mao et al. | ..................... | 411/194 |
| 5,015,133 A * | 5/1991 | Arena | ........................... | 411/267 |
| 5,098,241 A | 3/1992 | Aldridge et al. | | |
| 5,749,691 A | 5/1998 | Campbell | | |
| 6,632,058 B2 * | 10/2003 | Hoffmann et al. | ............ | 411/433 |
| 2005/0008456 A1 | 1/2005 | Birkelbach et al. | | |

FOREIGN PATENT DOCUMENTS

| | | |
|---|---|---|
| EP | 1387094 | 2/2004 |
| RU | 38373 U1 | 6/2004 |
| WO | 91/05182 A1 | 4/1991 |
| WO | 99/08006 | 2/1999 |

* cited by examiner

*Primary Examiner* — Gary Estremsky
(74) *Attorney, Agent, or Firm* — Lerner, David, Littenberg, Krumholz & Mentlik, LLP

(57) ABSTRACT

A retaining device for attachment to a screw contains a hollow base element for receiving a clamping part. The hollow base element has a floor having a hole, and an inner surface of the base element on the floor area of the retaining device is implemented as conical to contact the outer surface of the conical body of the clamping part. The clamping part can be moved downward in the direction of the floor by rotating the retaining device around its own axis and biting into a screw which is inserted through the hole and runs through the opening of the clamping part.

18 Claims, 6 Drawing Sheets

CLAMPING PART AND RETENTION DEVICE HAVING A CLAMPING PART OF THIS TYPE

REFERENCE TO RELATED APPLICATIONS

This application claims the benefit of the filing date of U.S. Provisional Patent Application No. 60/721,397 filed Sep. 28, 2005 and of German Patent Application No. 10 2005 046 362.2 filed Sep. 28, 2005, the disclosures of which are hereby incorporated herein by reference.

FIELD OF THE INVENTION

The present invention relates to a clamping part and a retention or holder device having a clamping part of this type, in particular a multipurpose holder for holding electrical wiring strands, pipes, etc. in aircraft.

TECHNOLOGICAL BACKGROUND

In aircraft, cable retainers are used for retaining and guiding electrical line routes, pipes, etc., in different areas. The retainers are preferably made of plastic because of its low intrinsic weight. The retainers are each tailored to the concrete connection conditions to the girders or frames, etc. For this purpose, a screw-nut connection is typically used.

A disadvantage of the known retainers is that in the event of changes of the structural components, costly and time-consuming changes of the retainers are necessary. The changes in injection molding molds are particularly complex and costly.

SUMMARY OF THE INVENTION

An object of the present invention is to provide a clamping part and a holder device having a clamping part of this type, which is usable and rapidly attachable mutually on girders having different material thicknesses.

This object may be achieved as indicated in claims 1 and 8. Refinements of the present invention are specified in the subclaims.

The clamping part according to an exemplary embodiment of the present invention has a conical body, through whose center an opening runs in the longitudinal direction of the body. At least one slot is located in the side wall of the body, which runs essentially perpendicularly to the longitudinal direction of the clamping part in order to receive an insert. The slot is implemented in such a way that when the insert is received in the slot, the insert projects into the opening in such a way that it forms a counterpart to a thread of a screw which may be inserted through the opening.

The slot is also implemented in such a way that the insert is secured against twisting in relation to the body.

According to a refinement of the clamping part, an insert partially projects outward out of the slot beyond the outer surface of the body.

According to an exemplary embodiment of the clamping part, the insert has the shape of a circular ring sector. Preferably, three slots are implemented in the body at a distance from one another around the circumference of the body, lying in one plane, to receive one insert each, which is preferably made of sheet metal.

According to a refinement of the clamping part, the conical body has a gap in its side wall running in the longitudinal direction of the clamping par which connects the opening running through the center of the body to the environment of the clamping part. The clamping effect is thus improved further.

According to an exemplary embodiment of the present invention, the holder device is used for attachment to a screw and contains a hollow base element for receiving the clamping part of one of claims 1 through 7, the hollow base element having a floor having a hole. An inner surface of the base element on the floor area of the holder device is implemented as conical in such a way that the outer surface of the conical body of the clamping part is contacted correspondingly. By rotating the holder device around its own axis, the clamping part is moved "downward" in the direction of the floor of the retaining device, through which the clamping part bites (clamps) into a screw which is inserted through the hole of the holder device and runs through the opening of the clamping part.

According to an exemplary embodiment, the holder device also contains a displacement lock, which is situated in the hollow base element to prevent the clamping part inserted into the hollow base element from falling out of the holder device.

According to an exemplary embodiment of the present invention, the displacement lock is supported on the inner surface of the hollow base element and engages, for example, in a groove running around the circumference of the inner surface of the base element, the screw to which the holder device is attached running through an opening formed in the displacement lock.

According to an exemplary embodiment, the displacement lock is implemented or adapted as a Seeger ring.

According to a refinement of the holder device, it has a holder at an end diametrically opposite the floor of the holder device, which may retain electrical line strands, pipes, etc.

The holder device according to the present invention comprises a plastic material and is injection molded, for example.

BRIEF DESCRIPTION OF THE DRAWING

In the following, preferred exemplary embodiments of the present invention are described with reference to the attached drawing.

DETAILED DESCRIPTION OF EXEMPLARY EMBODIMENT

Figure 1:
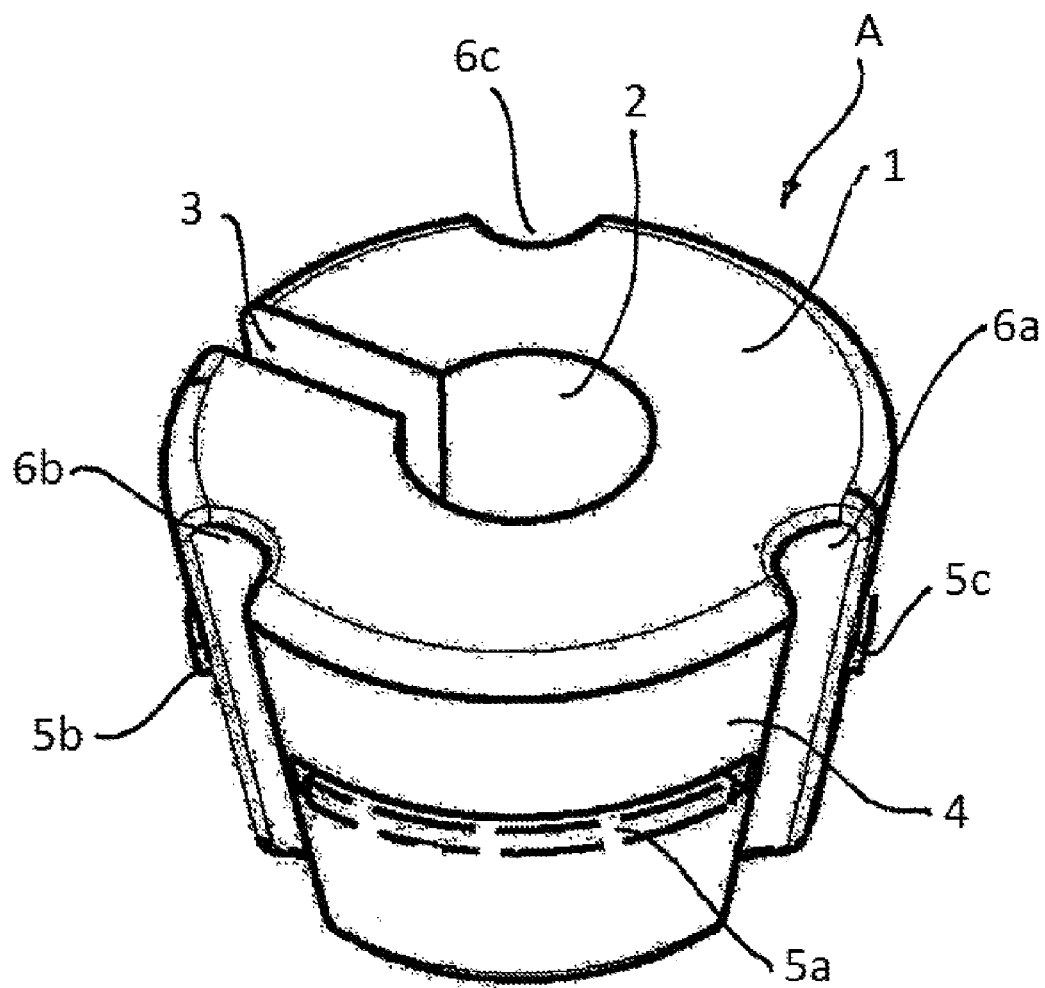
FIG. 1 shows a perspective view of a clamping part according to a preferred exemplary embodiment of the present invention.

In the following, identical reference numerals are used for identical or corresponding parts in the different views in the figures.

FIG. 1 shows a perspective view of a clamping part A according to an exemplary embodiment of the present invention.

As shown in FIG. 1, the clamping part A has a conical body 1, through whose center an opening 2 runs. As described later, the opening 2 is used for receiving a screw (not shown), to which a holder device which uses the clamping part A is attached, as described later with reference to FIG. 4.

The clamping part shown in FIG. 1 also has a gap 3, which connects the opening 2 to the external environment of the clamping part A. The gap 3 runs in the longitudinal direction of the clamping part A and is used for improving the clamping effect of the clamping part A. In the clamped state, the gap 3 is narrower than in the unclamped state.

Three separate slots 5a, 5b, and 5c are implemented in the side wall 4 of the clamping part, each of which runs essentially perpendicularly to the longitudinal direction of the clamping part A through the side wall 4 and connects opening 2 to the external environment of the clamping part A.

The slots 5a, 5b, and 5c are each separated from one another by recesses 6a, 6b, and 6c formed in the side wall 4 of the clamping part A.

The slots 5a-5c are used for receiving an insert, such as a sheet metal insert, which is described in greater detail with reference to FIG. 2.

Figure 2:
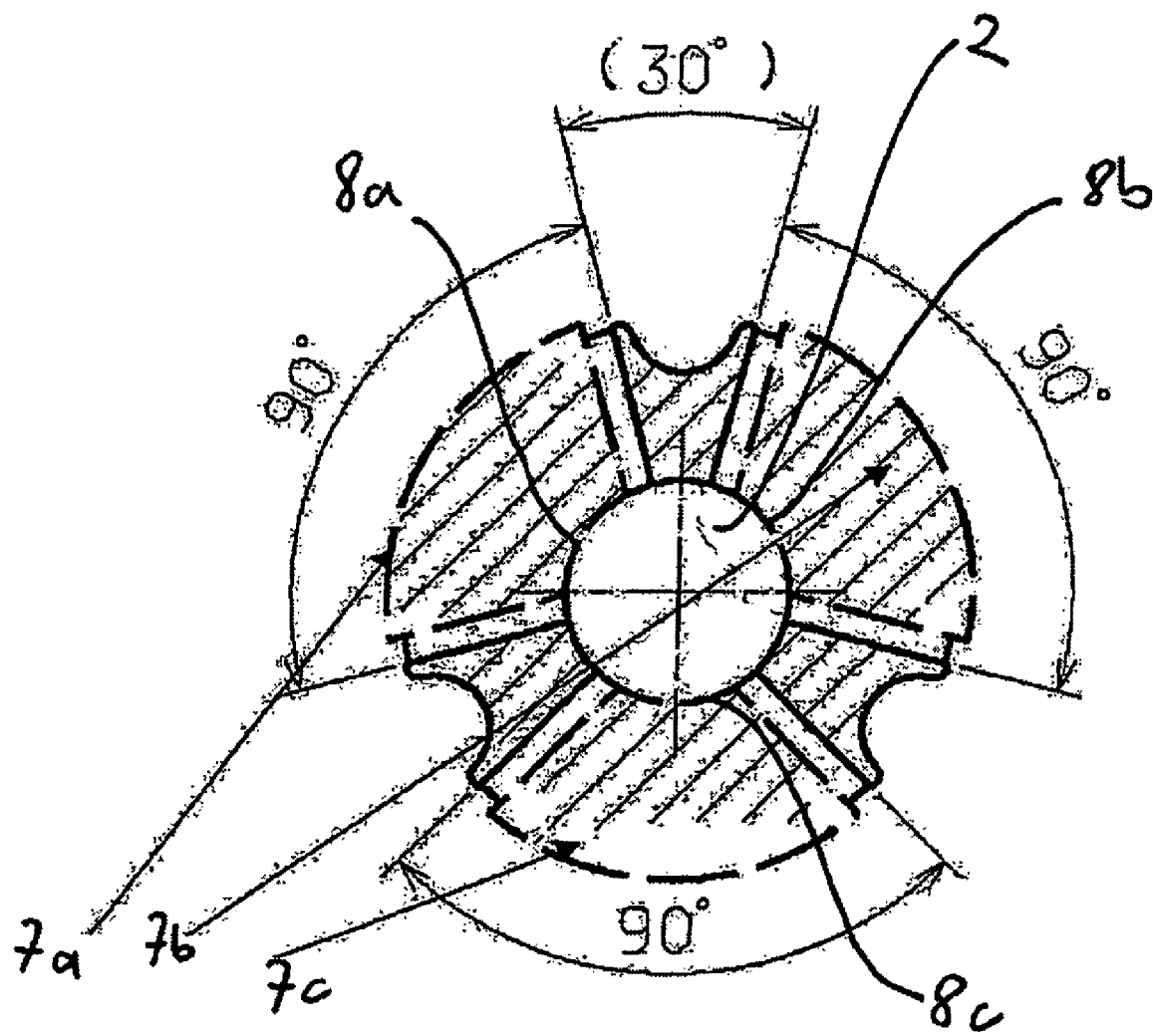
FIG. 2 shows a cross-sectional view of the clamping part of FIG. 1, which illustrates the sheet metal inserts.

FIG. 2 shows three sheet metal inserts 7a, 7b, and 7c, which may each be inserted into the slots 5a, 5b, and 5c of the clamping part A, the slots 5a-5c of the clamping part 1 being implemented in such a way that twisting of the sheet metal inserts 7a-7c is not possible.

As shown in FIG. 2, according to the exemplary embodiment, the sheet metal inserts 7a-7c are each implemented in the form of a circular ring sector, lie in one plane, and are spaced uniformly from one another. The sheet metal inserts 7a-c inserted into the slots 5a-c of the clamping part 1 are implemented in such a way that their areas 8a, 8b, and 8c pointing toward the opening 2 may engage in a thread of a screw (not shown) running through the opening 2.

According to an exemplary embodiment, the sheet metal inserts 7a-c are made of metal, but may be made of any other arbitrary material which is suitable as a counterpart to a screw for engaging in its thread.

The sheet metal inserts 7a-c may, for example, be formed from one piece and may be secured from twisting in relation to the body 1.

Figure 3:
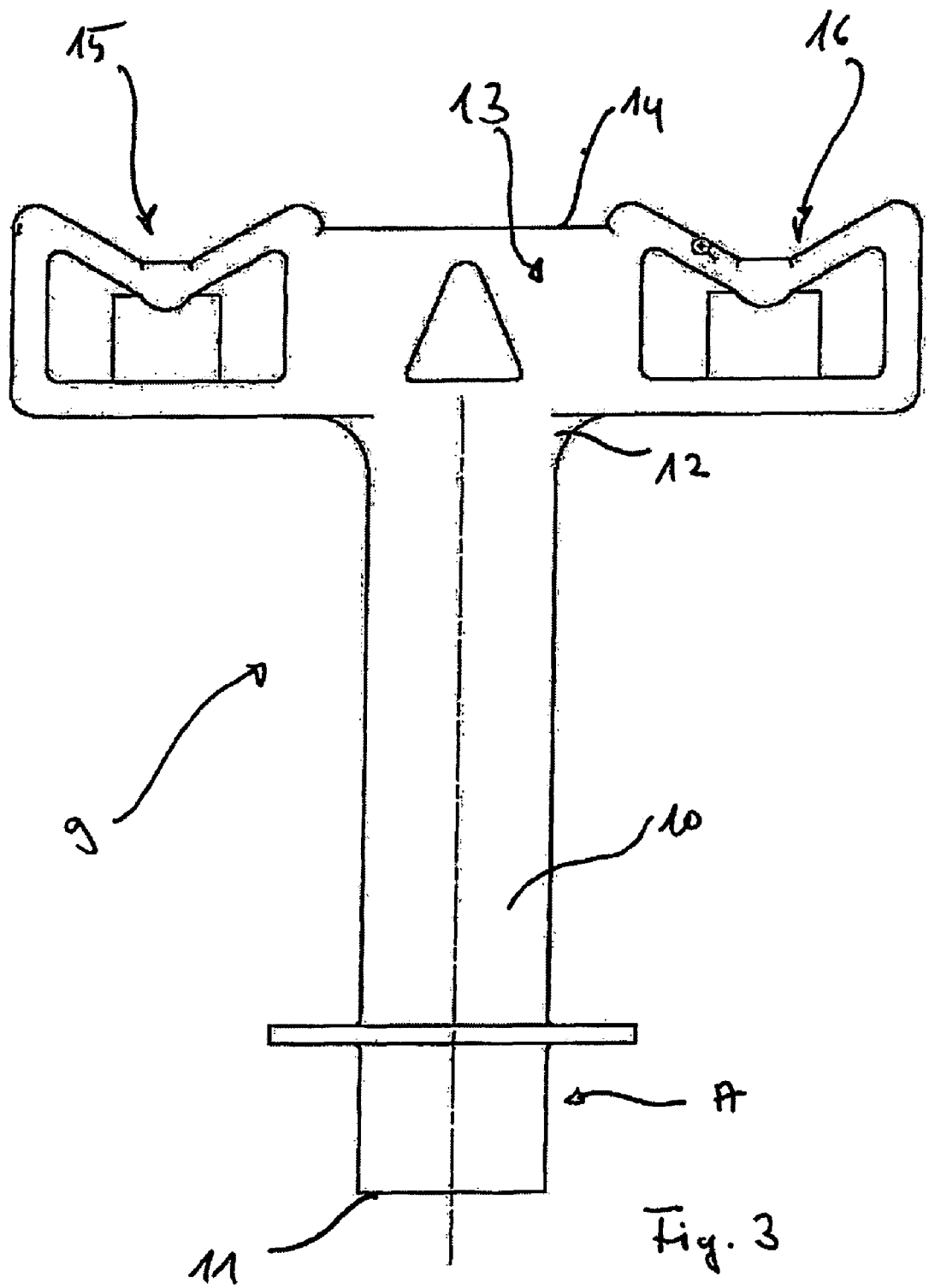
FIG. 3 shows a side view of a retaining device according to a preferred exemplary embodiment, which contains the clamping part of FIG. 1.

FIG. 3 shows a top view of a retaining or holder device 9 according to an exemplary embodiment, which contains the clamping part A of FIG. 1.

The holder device 9 contains a hollow base element 10, into which the clamping part A is inserted. The clamping part A is also not shown FIG. 3, but is located in the area of a floor 11 of the retaining device 9, as described in greater detail with reference to FIG. 4.

The holder device 9 shown in FIG. 3 has a holder or retainer 13 on an area 12 diametrically opposite the floor 11 of the holder device 9. The holder 13 is preferably injection molded from plastic and is implemented in one piece with the hollow base element 10. Alternatively, the holder 13 may be manufactured separately and comprise a different material, and may be placed on the hollow base element 10.

A middle area 14 of the retainer 13 is also implemented as hollow, so that the clamping part of FIG. 1 may be inserted from above in FIG. 3 into the hollow base element 10 of the holder device 9.

As shown in FIG. 3, the retainer 13 contains side areas 15, 16, which are designed to be able to support lines, such as electrical line strands, pipes, etc. More or less areas of this type may be implemented in accordance with the number of lines to be supported.

Figure 4:
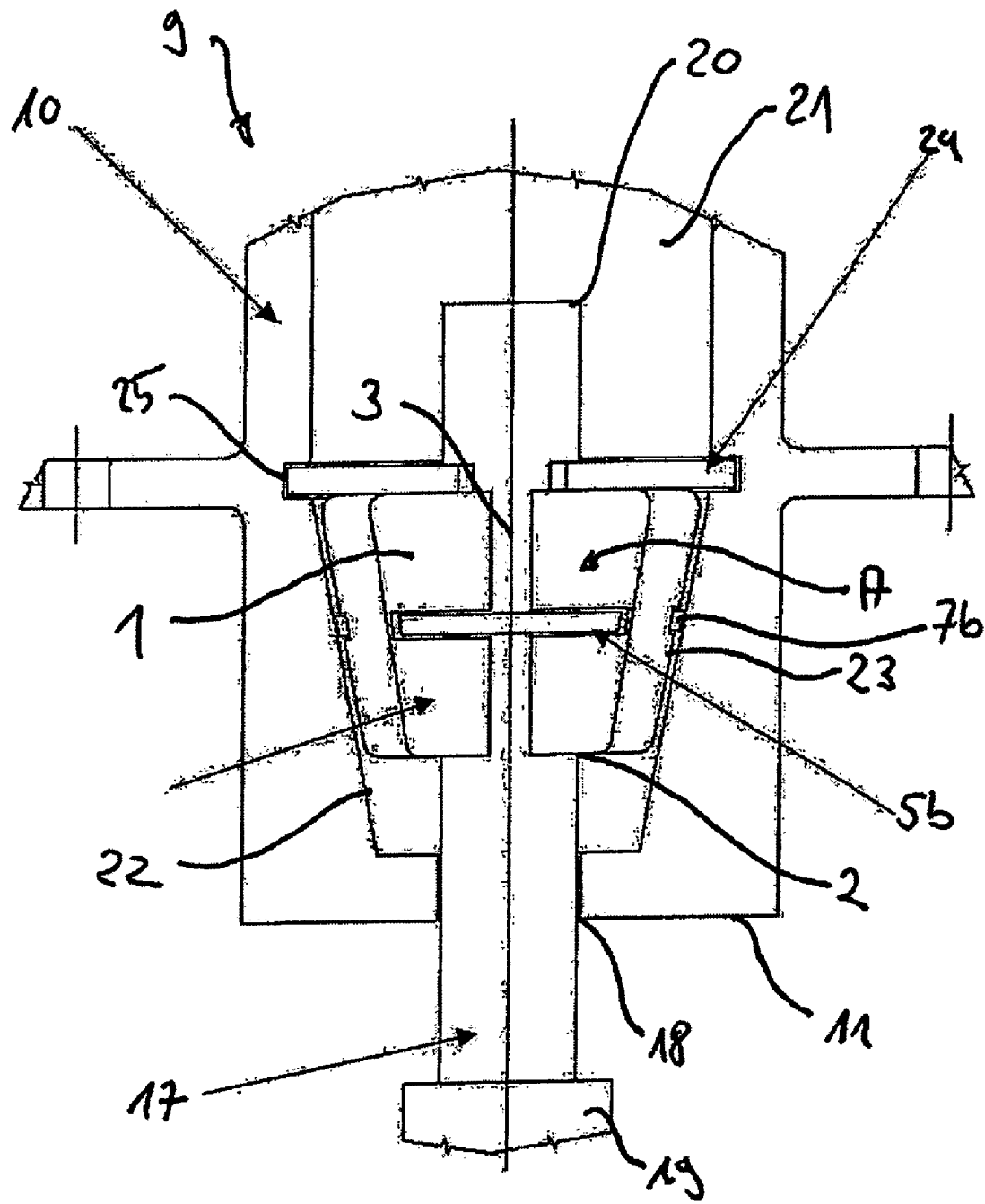
FIG. 4 shows a partial cross-sectional view of the retaining device of FIG. 3.

FIG. 4 shows a partial cross-sectional view of the holder device 9 of FIG. 3 having inserted clamping part A.

The illustration shown in FIG. 4 shows the holder device 9 of FIG. 3 attached to a screw 17. The screw 17 in FIG. 4 is inserted from below through an opening 18 implemented in the floor 11 of the hollow base element 10 of the clamping device 9 and runs through the opening 2 of the body 1 of the clamping part A. The end 20 of the screw 17 diametrically opposite the head 19 of the screw 17 opens into the cavity 21 of the base element 10 of the holder device 9.

The screw 17 is guided through a transverse girder or frame (not shown), for example, by which the holder device 9 is attached to the girder or frame by tightening the screw 17.

As shown in FIG. 4, an inner surface 22 of the hollow base element 10 is implemented as conical and contacts the conically implemented outer surface 23 of the body 1 of the clamping part.

As shown in FIG. 4, a displacement lock 24 is introduced into the cavity 21 of the base element 10 of the holder device 9, which is a Seeger ring, for example. The Seeger ring 24 is used as a displacement lock during placement of the holder device 9 and in the event of counterpressure on the screw 17 or the counterpart of the holder device 9.

As shown in FIG. 4, the Seeger ring 24 engages in a recess 25 formed in the circumference of the inner surface of the base element 10 and is supported there By rotating the retaining device 9 around its own axis, the clamping part A is moved downward in the direction of floor 11, due to which the clamping part clamps (bites) in the screw 17.

Figure 5:
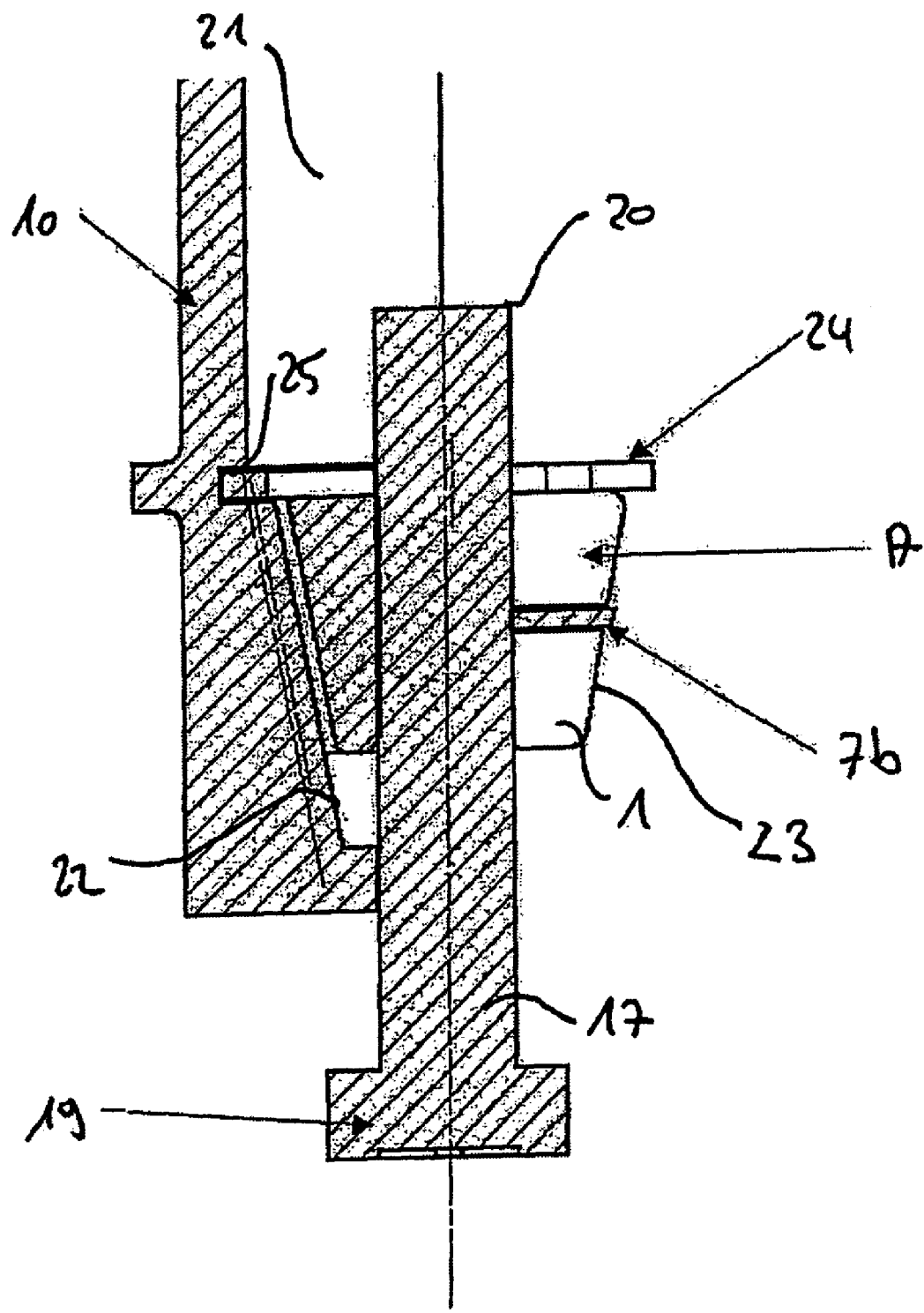
FIG. 5 shows a partial cross-sectional view of the retaining device of FIG. 3 from the side.

FIG. 5 shows a partial cross-sectional view of the holder device 9 of FIG. 3 from the side.

Figure 6:
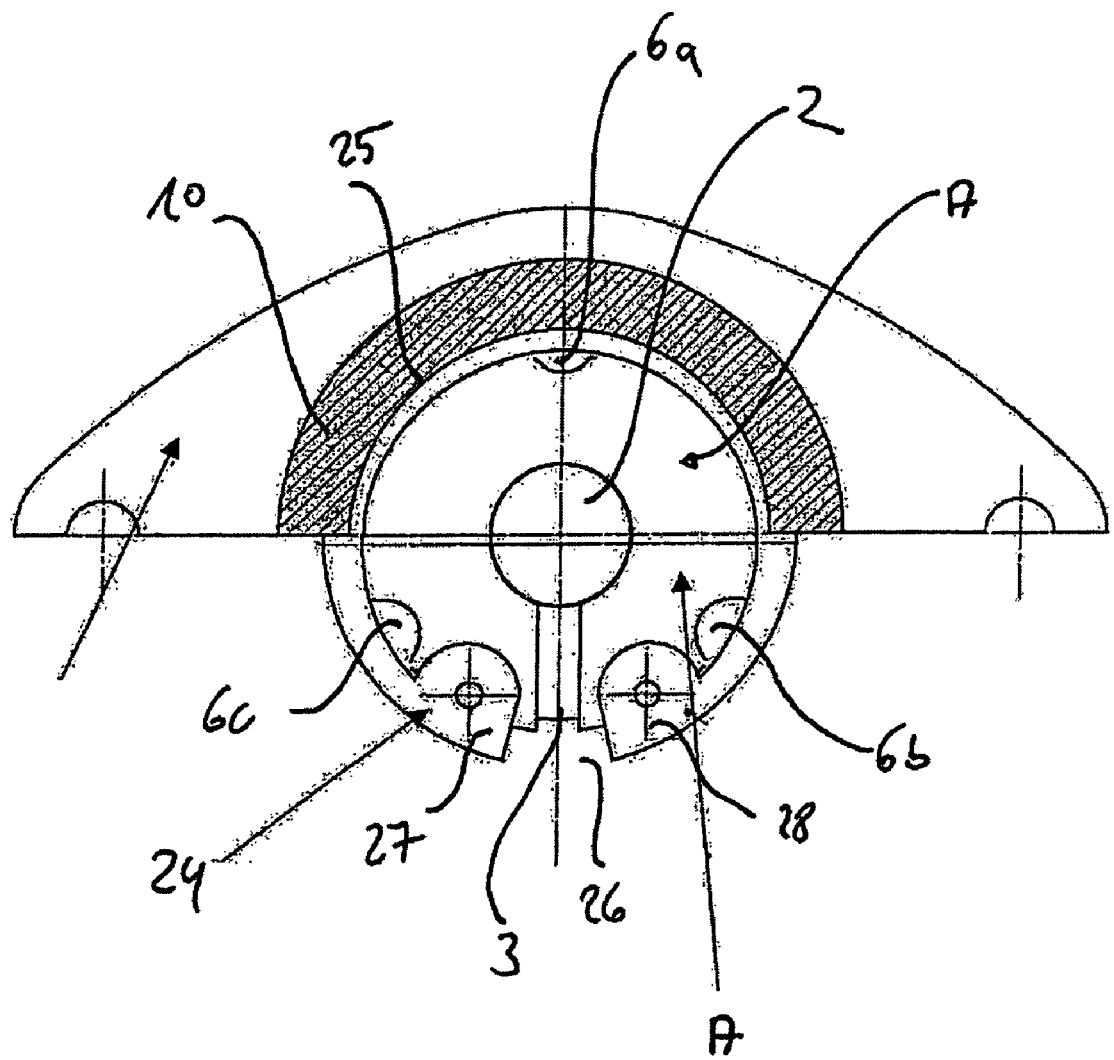
FIG. 6 shows a partial cross-sectional view of the retaining device of FIG. 3 from above.

FIG. 6 shows a partial cross-sectional view of the holder device 9 of FIG. 3 from above.

As shown in FIG. 6, the displacement lock 24 engaging in the recess 25 of the base element 10 is implemented in such a way that it has an open area 26, so that the two free ends 27, 28 of the displacement lock 24 may be pressed toward one another in order to be able to remove or insert the displacement lock 24 from or into, respectively, the recess 25 and the hollow base element 10.

Although the present invention was described above with reference to an application in the field of aircraft, it is obvious that the clamping part according to the present invention and the clamping device according to the present invention may be used in other fields in which it is also necessary to use retainers which are usable and rapidly attachable on girders having different material thicknesses.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be seen as a restriction.

LIST OF REFERENCE NUMBERS

A clamping part
1 body
2 opening
3 gap
4 side wall
5a-c slots
6a-c recesses
7a-c sheet-metal inserts
8a-c areas
9 retaining device
10 base element
11 floor
12 diametrically opposite area
13 retainer 14 middle area
15, 16 side areas
17 screw
18 hole
19 head
20 end
21 cavity
22 inner surface
23 outer surface
24 displacement lock
25 recess
26 open area
27, 28 free ends of the displacement lock

The invention claimed is:

1. A clamping part comprising a conical body having a longitudinal direction, a center through which an opening runs in the longitudinal direction of the body, and a side wall having at least one slot which runs substantially perpendicular to the longitudinal axis of the clamping part, and an insert received within the at least one slot which projects far enough into the opening that the insert is adapted as a counterpart to a thread of a screw running through the opening;
    wherein the insert has the form of a circular ring sector.

2. The clamping part of claim 1, wherein the at least one slot prevents twisting of the insert.

3. The clamping part of claim 1, wherein the insert projects partially outward out of the at least one slot beyond an outer surface of the body.

4. The clamping part of claim 1, wherein the insert is made of sheet metal.

5. A holder device for attaching a screw, the holder device comprising a hollow base element for receiving a clamping part comprising a conical body having a longitudinal direction, a center through which an opening runs in the longitudinal direction of the body, and a side wall having at least one slot which runs substantially perpendicular to the longitudinal axis of the clamping part, and an insert received within the at least one slot which projects far enough into the opening that the insert is adapted as a counterpart to a thread of a screw running through the opening,
    wherein the hollow base element has a floor having a hole and an inner surface of the base element is implemented as conical to contact an outer surface of the conical body of the clamping part, the clamping part being moved downward in a direction of the floor by rotating the holder device around an axis of the holder device and biting into a screw which is inserted through the hole and runs through the opening of the clamping part.

6. The holder device of claim 5, further comprising a displacement lock insertable into the hollow base element to prevent the clamping part from falling out of the base element.

7. The holder device of claim 6, wherein the displacement lock is supportable on the inner surface of the hollow base element and the screw runs through the displacement lock when the holder device is attached to the screw.

8. The holder device of claim 7, wherein the displacement lock comprises a Seeger ring.

9. The holder device of claim 5, wherein a holder to retain lines is formed on an area diametrically opposite the floor of the hollow base element.

10. The holder device of claim 5, wherein the holder device is injection molded from a plastic material.

11. A clamping part comprising a conical body having a longitudinal direction, a center through which an opening runs in the longitudinal direction of the body, and a side wall having at least one slot which runs substantially perpendicular to the longitudinal axis of the clamping part, and an insert received within the at least one slot which projects far enough into the opening that the insert is adapted as a counterpart to a thread of a screw running through the opening;
    wherein the at least one slot includes three slots at a distance from one another around the circumference of the body, lying in one plane, for receiving one insert each.

12. The clamping part of claim 11, wherein each of the three slots prevents twisting of the insert received therein.

13. The clamping part of claim 11, wherein the insert projects partially outward out of the slot beyond an outer surface of the body.

14. The clamping part of claim 11, wherein the insert is made of sheet metal.

15. A clamping part comprising a conical body having a longitudinal direction, a center through which an opening runs in the longitudinal direction of the body, and a side wall having at least one slot which runs substantially perpendicular to the longitudinal axis of the clamping part, and an insert received within the at least one slot which projects far enough into the opening that the insert is adapted as a counterpart to a thread of a screw running through the opening;
    wherein the conical body has a gap running in the side wall in the longitudinal direction of the clamping part, via which the opening is connected to the environment of the clamping part.

16. The clamping part of claim 15, wherein the at least one slot prevents twisting of the insert.

17. The clamping part of claim 15, wherein the insert projects partially outward out of the at least one slot beyond an outer surface of the body.

18. The clamping part of claim 15, wherein the insert is made of sheet metal.

* * * * *

UNITED STATES PATENT AND TRADEMARK OFFICE
CERTIFICATE OF CORRECTION

| | | |
|---|---|---|
| PATENT NO. | : 8,075,235 B2 | Page 1 of 1 |
| APPLICATION NO. | : 11/992361 | |
| DATED | : December 13, 2011 | |
| INVENTOR(S) | : Lueder Kosiankowski, Lutz Zeuner and Hans-Peter Guthke | |

It is certified that error appears in the above-identified patent and that said Letters Patent is hereby corrected as shown below:

In the Specifications:

Col. 1, Line 64, "clamping par" should read --clamping part,--.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,075,235 B2
APPLICATION NO. : 11/992361
DATED : December 13, 2011
INVENTOR(S) : Lueder Kosiankowski, Lutz Zeuner and Hans-Peter Guthke It is certified that error appears in the above-identified patent and that said Letters Patent is hereby corrected as shown below:

In the Specification

Column 3, Line 7 "the" should be replaced by --a--

Signed and Sealed this
Tenth Day of December, 2013

Margaret A. Focarino
*Commissioner for Patents of the United States Patent and Trademark Office*